United States Patent
Wilkinson

(10) Patent No.: US 9,892,358 B2
(45) Date of Patent: Feb. 13, 2018

(54) METHOD AND APPARATUS PERTAINING TO RADIO-FREQUENCY IDENTIFICATION TAGS

(75) Inventor: Bruce W. Wilkinson, Rogers, AR (US)

(73) Assignee: Wal-Mart Stores, Inc., Bentonville, AR (US)

( * ) Notice: Subject to any disclaimer, the term of this patent is extended or adjusted under 35 U.S.C. 154(b) by 324 days.

(21) Appl. No.: 13/398,492

(22) Filed: Feb. 16, 2012

(65) Prior Publication Data

US 2012/0274449 A1 Nov. 1, 2012

Related U.S. Application Data

(60) Provisional application No. 61/479,667, filed on Apr. 27, 2011.

(51) Int. Cl.
| | | |
|---|---|---|
| *G06K 19/07* | (2006.01) | |
| *G01S 11/06* | (2006.01) | |
| *G01S 13/75* | (2006.01) | |
| *G01S 13/76* | (2006.01) | |
| *G01S 13/82* | (2006.01) | |

(52) U.S. Cl.
CPC .......... *G06K 19/0723* (2013.01); *G01S 11/06* (2013.01); *G01S 13/751* (2013.01); *G01S 13/767* (2013.01); *G01S 13/825* (2013.01); *G06K 19/0712* (2013.01)

(58) Field of Classification Search
CPC .......... G06K 7/10366; G06K 19/0712; G06K 19/0723; H04B 5/0062
USPC ...................................................... 340/10.1
See application file for complete search history.

(56) References Cited

U.S. PATENT DOCUMENTS

| | | | |
|---|---|---|---|
| 6,396,438 B1 * | 5/2002 | Seal ........................ | G01S 13/34 |
| | | | 342/104 |
| 7,733,227 B1 | 6/2010 | Pesavento et al. | |
| 8,228,173 B2 * | 7/2012 | Missimer et al. | ........... 340/10.2 |
| 8,334,801 B2 * | 12/2012 | Fretenburg et al. | .......... 342/125 |

(Continued)

FOREIGN PATENT DOCUMENTS

| | | |
|---|---|---|
| EP | 2428817 | 3/2012 |
| WO | 2011/009767 | 1/2011 |

OTHER PUBLICATIONS

"EPC Radio-Frequency Identity Protocols Class-1 Generation-2 UHF RFID Protocol for Communications at 860 MHz-960 MHz Version 1.0.9;" Specification for RFID Air Interface by EPCglobal Inc.; 94 pages, Jan. 2005.

(Continued)

*Primary Examiner* — Vernal Brown
(74) *Attorney, Agent, or Firm* — Fitch, Even, Tabin & Flannery LLP

(57) ABSTRACT

A presently-powered RFID tag can itself determine its own relative movement with respect to a reader. This RFID tag can responsively alter its read state to thereby permit the RFID tag to respond to a subsequent read inquiry. By one approach the RFID tag assesses its own movement by monitoring the strength of its received power. By another approach, the RFID tag has a power source that becomes electrically charged via radio-frequency energy received by the tag antenna and that power source is configured to become operably discharged at a point in time that corresponds to a typical null-sensing duration of time for a given application setting for that RFID tag.

9 Claims, 4 Drawing Sheets

(56) References Cited

U.S. PATENT DOCUMENTS

2003/0121985 A1\* 7/2003 Baldischweiler .. G06K 19/0707
 235/492
2007/0182578 A1\* 8/2007 Smith ........................ 340/669
2009/0021376 A1 1/2009 Calvarese
2010/0156651 A1 6/2010 Broer

OTHER PUBLICATIONS

IPO; App. No. GB1207319.3; Combined Search and Examination Report dated Aug. 22, 2012.

\* cited by examiner

US 9,892,358 B2

METHOD AND APPARATUS PERTAINING TO RADIO-FREQUENCY IDENTIFICATION TAGS

RELATED APPLICATION(S)

This application claims the benefit of U.S. Provisional application No. 61/479,667, filed Apr. 27, 2011, which is incorporated by reference in its entirety herein.

TECHNICAL FIELD

This invention relates generally to radio-frequency identification (RFID) tags.

BACKGROUND

RFID tags are known in the art. RFID tags are typically small circuits that are configured to respond to a radio-frequency (RF) signal with a corresponding data transmission. Some RFID tags are self-powered while others are passive in that they rely upon the received RF signal for their operating power (and some RFID tags are a hybrid of these two approaches).

Many times the RFID tag's data includes information, such as an identifier, that is unique (at least to some extent) to that particular responding RFID tag. The Electronic Product Code (EPC) as managed by EPCGlobal, Inc., for example, represents one such effort in these regards. EPC-based RFID tags each have an utterly unique serial number (within the EPC system) to thereby uniquely identify each tag and, by association, each item associated on a one-for-one basis with such tags. (The corresponding document entitled EPC Radio-Frequency Identity Protocols Class-1 Generation-2 UHF RFID Protocol for Communications at 860 MHz-960 MHz Version 1.0.9 (often referred to as "EPC GEN2") is hereby fully incorporated herein by this reference.)

In some application settings it can be important to selectively limit the responsiveness of such RFID tags. In an application setting where there will typically be hundreds or even thousands of RFID tags within a given small area, for example, it can be counterproductive to permit such RFID tags to repeatedly respond to continuous read inquiries from a corresponding reader (or readers). To accommodate such a circumstance, it is known to permit the selective setting of a given RFID tag's read state (or states). Using such an approach, for example, a given RFID tag, once read, can remain silent as a function of that read state notwithstanding follow-on read inquiries.

Figure 1:
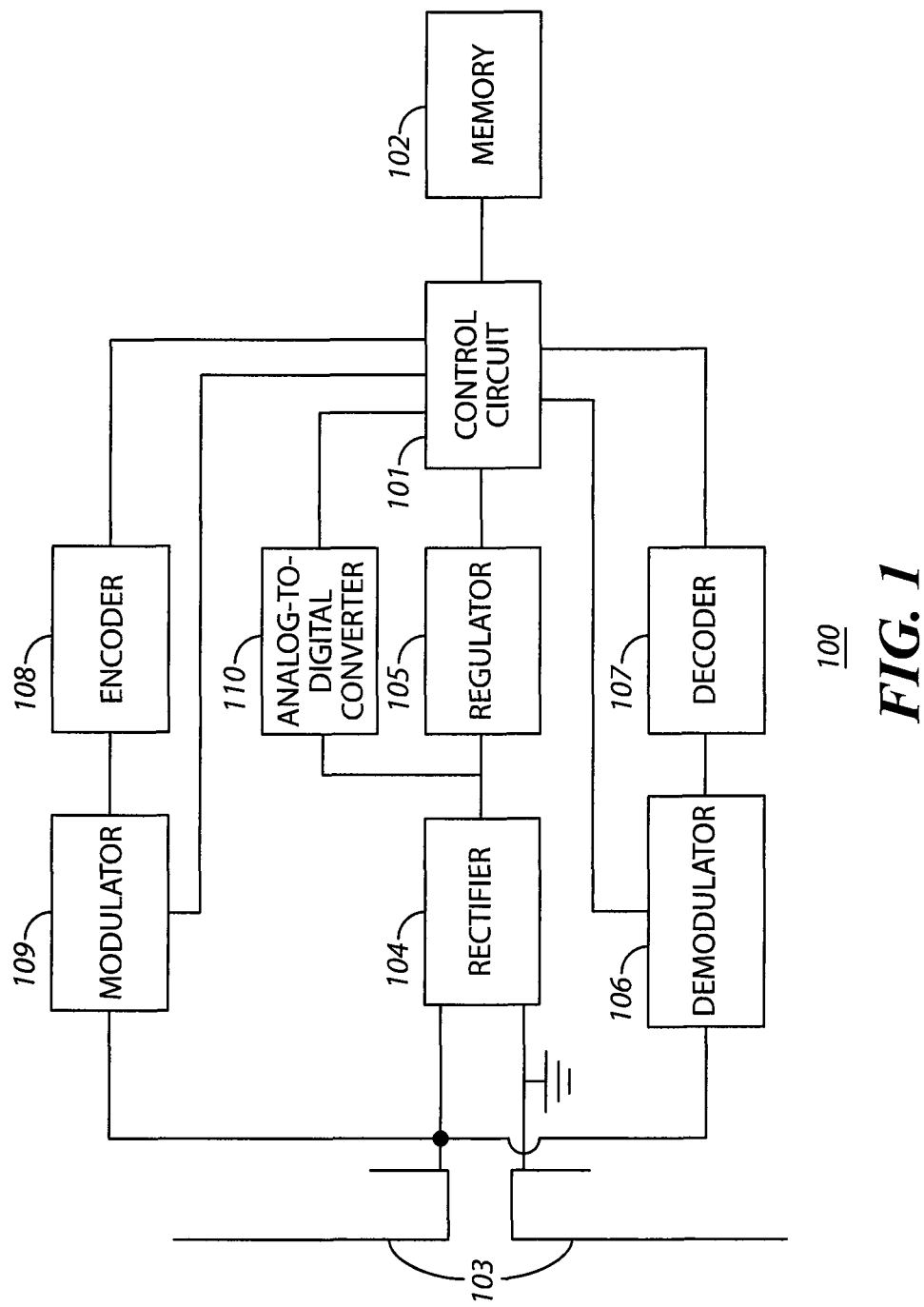
FIG. 1 comprises a block diagram as configured in accordance with various embodiments of the invention.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

While prior art practices are useful to address many operating circumstances, the applicant has determined that such approaches nevertheless give rise to other problems and concerns. As but one example in these regards, a given enterprise may wish to know when a given RFID tag moves from a present location. Using present approaches to quieting RFID tags, however, ascertaining such movement can become very difficult in many cases. The applicant has also determined that there may be circumstances when it would be useful for an RFID tag to be able to unilaterally change its read state.

Generally speaking, pursuant to these various embodiments, a presently-powered RFID tag can itself attempt to determine its own relative movement with respect to a reader. Also generally pursuant to these various embodiments, an RFID tag can automatically alter its read state to thereby, for example, permit the RFID tag to respond to a subsequent read inquiry. By one approach, these two concepts are combined such that an RFID tag will automatically change its own read state as a function of information that tends to correlate with movement of the RFID tag.

By one approach the RFID tag can assess its own movement by monitoring the strength of its received power. In particular, as the RFID tag moves (amongst presumably stationary readers), the received power will increase or decrease in strength. By monitoring such changes in received power the RFID tag can infer movement. Both active and passive RFID tags can employ such an approach.

By another approach, used in lieu of the foregoing or in combination therewith, the RFID tag has a power source that becomes electrically charged via radio-frequency energy received by the tag antenna and that power source is configured to become operably discharged at a point in time that corresponds to a typical null-sensing duration of time for a given application setting for that RFID tag. In many typical application settings that include a number of RFID-tag readers having overlapping coverage areas, and where the duration of time corresponds to a typical time that a person carrying the RFID tag will be in a radio-frequency null when walking at a typical rate through the application setting, that duration of time can be, for example, within a range of about three seconds to about five seconds. In such a case, and when the RFID tag is configured to use a specific reader-response state upon regaining power following an operable discharge of such a power supply, upon exiting the null the RFID tag can automatically configure itself to respond to a read inquiry as a direct result of having effectively sensed its own relative movement with respect to one or more of the RFID-tag readers in the application setting.

So configured, individual RFID tags can be effectively self-aware of their own relative movement with respect to one or more readers. This awareness, in turn, can serve to modify the RFID tag's own behavior regarding when, and how, to respond to a read inquiry. Using this approach, for example, a properly-quieted RFID tag can again respond to a read opportunity in response to detecting its own movement. This information, in turn, can serve a wide variety of purposes. These teachings are highly flexible in practice and can be scaled to accommodate a wide variety of RFID tag architectures, methodologies, and protocols.

These and other benefits may become clearer upon making a thorough review and study of the following detailed description. Referring now to the drawings, and in particular to FIG. 1, various illustrative examples in these regards will be provided. It shall be understood that these teachings are not to be viewed as being limited by the specifics of these examples. Also, for the sake of illustration the depicted RFID tag comprises a passive RFID tag. It shall be understood, however, that these approaches can be applied in conjunction with other architectural approaches as well including so-called active tags and hybrid tags that combine active and passive methodologies.

In this example the RFID tag 100 includes a control circuit 101 and a memory 102 that operably couples to the control circuit 101. Such a control circuit 101 can comprise a fixed-purpose hard-wired platform or can comprise a partially or wholly programmable platform. All of these architectural options are well known and understood in the art and require no further description here. The memory 102 can serve to store executable code (when the control circuit 101 comprises a partially or wholly programmable platform) and/or other information (such as a unique EPC code or the like).

The control circuit 101 relies upon received power for its own operating power. In particular, an antenna 103 receives a reader's RF signal. A rectifier 104 then rectifies that signal to provide a direct-current (DC) voltage and a regulator 105 regulates that DC voltage to provide stable operating power to the control circuit 101 (and other components as desired). (Depending upon the sensitivity of the control circuit 101 to voltage-level fluctuations, some RFID tag architectures may eschew inclusion of the regulator 105.)

A typical RFID tag 100 will also often include a demodulator 106 and decoder 107 to facilitate receiving data or instructions from a reader and providing that recovered content to the control circuit 101 as well as an encoder 108 and a modulator 109 to facilitate transmitting data sourced by the control circuit 101. As the workings of such components is well known in the art, and as the present teachings are not overly sensitive to any particular choices in these regards, further elaboration will not be provided here.

This illustrative RFID tag 100 also includes an analog-to-digital converter 110. Here, this analog-to-digital converter 110 has its input connected to receive the rectified output of the rectifier 104 (as versus, for example, the regulated output of the regulator 105). The analog-to-digital converter 110 in turn provides a digital representation of the rectified power signal to the control circuit 101. So configured, the control circuit 101 can then monitor the power level (which reflects, in turn, the power of the RF signal being received by the antenna 103) and use the resultant information to determine its own relative movement with respect to the reader that sources the RF signal. Accordingly, in a broad sense, the control circuit 101 can function to determine whether the RFID tag 100 is moving relative to a reader.

Those skilled in the art will appreciate that there are other approaches that can serve in these same regards. As one example, instead of a digitization approach, one could utilize one or more comparators that compare the (scaled or unscaled, as desired) rectified results with one or more analog levels to detect when such levels are exceeded in either a positive or a negative direction.

By one approach, and regardless of whether one utilizes a digital or analog methodology, the described comparison can comprise a comparison of an essentially instantaneous sample as corresponds to the received power or a longer-term representation can serve in these same regards. As one simple example of such an approach, the control circuit (and/or whatever comparison mechanism might serve in a given application setting) can compare an average of the received power over some given period of time (such as a few milliseconds or a few seconds) against one or more thresholds of interest.

By one approach, these comparison thresholds can themselves change if and as the received power level changes. Such an approach can be useful in many application settings because the absolute received power levels often will not be as interesting as the fact that a relative change in received power occurs over some relevant period of time.

Such an RFID tag 100 may be comprised of a plurality of physically distinct elements as is suggested by the illustration shown in FIG. 1. It is also possible, however, to view this illustration as comprising a logical view, in which case one or more of these elements can be enabled and realized via a shared platform. For example, the analog-to-digital converter 110 might itself comprise a part of an integrated circuit or other component that also includes the control circuit 101.

Figure 2:
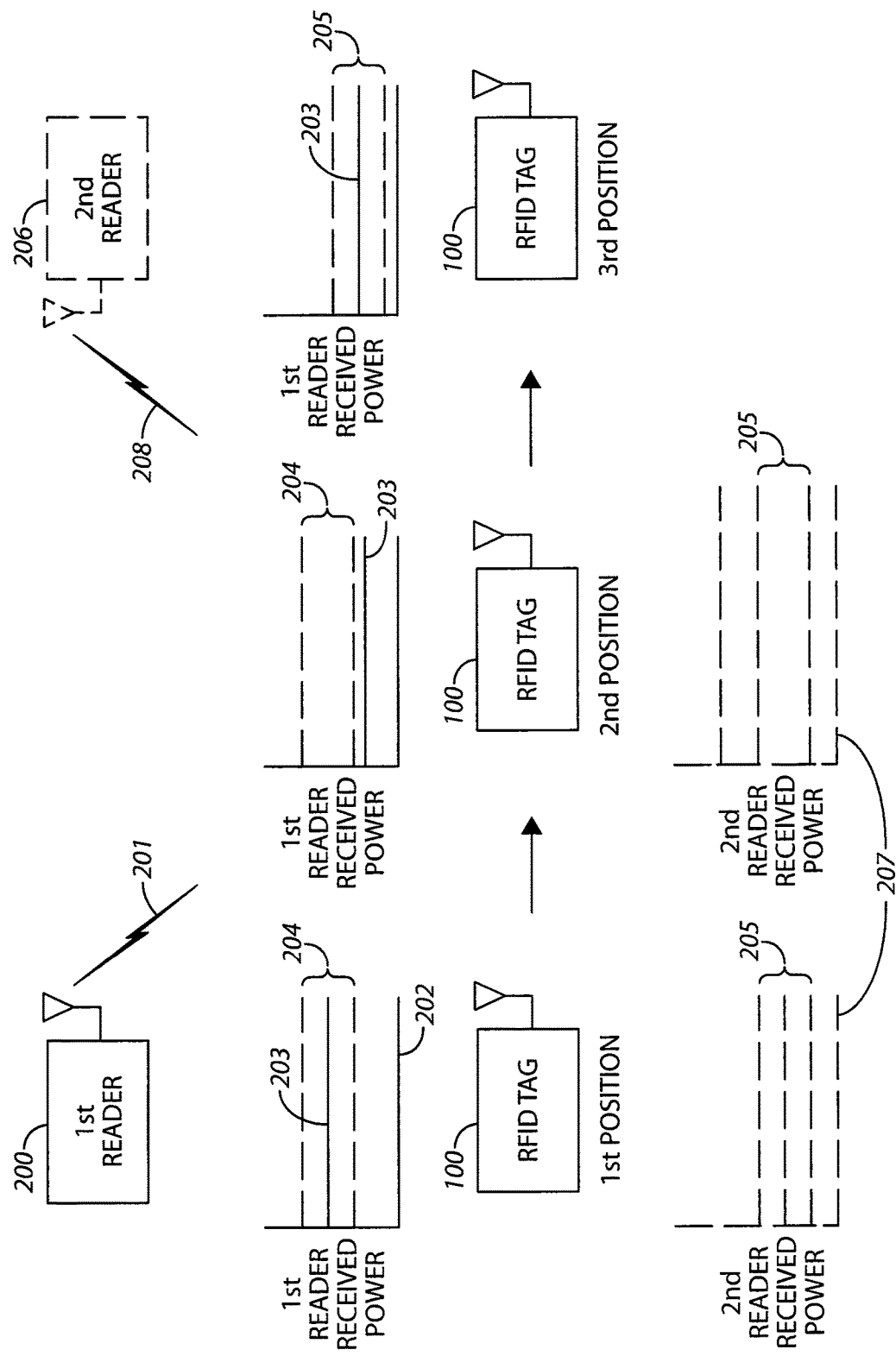
FIG. 2 comprises a schematic representation as configured in accordance with various embodiments of the invention.

Referring now to FIG. 2, some further illustrative examples will be provided.

This figure illustrates an RFID tag 100 that moves from a first position and through a second position to a third position with respect to a stationary reader 200. This reader 200, in this illustrative example, transmits its RF signal 201 on a more-or-less continuous basis. (Those skilled in the art will recognize that such need not always be the case and it shall therefore be understood that these teachings can also be useful in other application settings including application settings that employ intermittent readers (including both periodic as well as aperiodic readers).) Accordingly, the RFID tag 100 receives this RF signal 201 more-or-less continuously and hence remains powered up and operational.

A first received-power graph 202 depicts the rectified power 203 being received (and detected) by the RFID tag 100 when located at the first position. In this illustrative example the RFID tag 100 dynamically establishes a detection range 204 that brackets the present rectified power level 203 in both a positive and negative direction. This range 204 might be set, for example, based upon a detected rectified power level that persists for some minimal period of time (such as, for example, a tenth of a second, a half of a second, a second, or some other duration of interest).

The extent of the range 204 can be selected to meet the needs of a given application setting. For the sake of example, it will be presumed here that the range is 0.05 volts and the limits of the range 204 are set on equally-spaced sides of the present rectified power 203. In any event, so configured, the rectified power level can vary somewhat over time without causing the RFID tag 100 to detect corresponding motion. This, in turn, can help to prevent the RFID tag 100 from responding too aggressively to RF signal perturbations that have nothing to do with movement of the RFID tag 100 itself.

With continued reference to FIG. 2, and to continue with this example, as the RFID tag 100 moves to the second position on its way to the third position, the detected power level 203 from the reader 200 decreases as the distance between the reader 200 and the RFID tag 100 grows. As illustrated, at the second position the detected power level 203 is now outside the aforementioned range 204.

By one approach, that this should happen for even an instant can be sufficient to detect that the RFID tag 100 has moved (from the first position). By another approach, if desired, the RFID tag 100 may require that such a state persist continuously for some predetermined amount of time (such as 0.1 seconds, 0.5 seconds, 1.0 second, or the like) before concluding that motion has/is occurring. And by yet another approach, either in combination with the immediately foregoing or in lieu thereof, the RFID tag 100 may conclude that motion is occurring if such a state develops repeatedly, albeit it for only brief instances of time, provided a certain minimal number of such events are detected within some given duration of time.

To again continue with the present example, upon reaching the third position the RFID tag 100 stops moving. Accordingly, it may be expected that the detected power level 203 has stopped moving as well. By one approach, the RFID tag 100 may now apply a translated detection range 205 (which may have the same absolute range and plus-or-minus relationship to the detected power level 203) that will again permit the RFID tag 100 to reliably detect when the received power level 203 begins to change to a significant extent.

In some application settings there can be two or more readers that simultaneously communicate with a given RFID tag. To the extent these multiple readers might employ differing carrier frequencies, a given RFID tag 100 can monitor the aggregated power levels as pertain to multiple readers. FIG. 2 depicts, for example, an optional second reader 206 using an RF signal 208 having a distinct carrier frequency can be independently utilized, as shown in the graphs denoted by reference numeral 207, to detect the motion of interest. In particular, in this instance the strength of the RF signal 208 changes as the RFID tag nears the second reader 206 until the RF signal value again exceeds the detection range 205.

This information regarding detected motion can be utilized by an RFID tag in any of a variety of ways. By one approach, and by way of a non-limiting example, such information can serve to influence the responsiveness of an RFID tag to a reader's interrogations.

Figure 3:
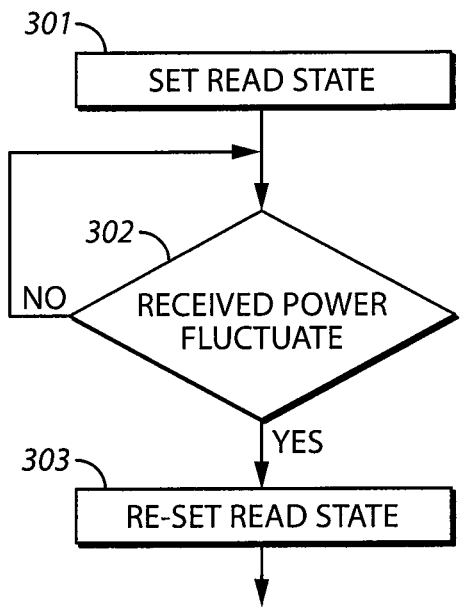
FIG. 3 comprises a flow diagram as configured in accordance with various embodiments of the invention.

FIG. 3 provides a non-limiting example in these regards. In the illustrated process 300 the RFID tag sets a read state at step 301. Presuming the RFID tag to employ selected aspects of EPC GEN2, this might comprise, for example, automatically switching from state A to state B in a given session in response to having provided a response to a reader's interrogation. In addition, or in lieu of the foregoing, this might also comprise, for example, flipping an inventory flag or some other selected flag (SL) of choice as accommodated by EPC GEN2.

The RFID tag then monitors for movement as described above. Upon detecting a fluctuation in received power (at step 302) sufficient to indicate motion, this process 300 then provides, at step 303, for re-setting that read state. In a typical application setting, this will permit the RFID tag to respond to the interrogations of the reader. When those interrogations are essentially continuous, this essentially permits the RFID tag to immediately make its presence known when the RFID tag experiences movement.

By one approach the next transmissions of the RFID tag may include a specific message or code to indicate such movement. By another approach, however, the RFID tag can simply respond with its usual data and leave it up to the infrastructure to place any special significance upon this particular transmission of the RFID tag. For example, the infrastructure system may be able to presume and infer that movement of the RFID tag is the underlying cause behind a somewhat unexpected transmission from an RFID tag that might otherwise be expected to be "quiet."

The information that a given RFID tag is in motion, in turn, can drive and inform any number of other actions. This can include automated updates regarding the existence and location of the moving RFID tag, automatically prompting reader interrogations of other RFID tags that may relate in some manner (by type or proximity) to the moving RFID tag, providing automated alerts to authorized personnel, and so forth.

So configured, an RFID tag can be configured to itself detect when it is moving. This information, in turn, can be used to automatically influence the behavior of the RFID tag with respect to whether and/or how to respond to a given reader's signals. This capability can contribute, for example, to considerably simplified database management requirements while simultaneously offering the considerable benefits of being able to know, more or less in real time, when given RFID tags are moving. Normally, in order to know if a tag is moving out of a large population of tags, all the tags would need to be read continuously since there isn't prior knowledge of which tag is likely to be moved. In order to detect which tag is moving, each tag read would need to be compared with where it was last read and the tags that are read in a different location could then be characterized as tags that moved. The data requirement and throughput would overwhelm most systems.

Those skilled in the art will appreciate that these teachings can likely be leveraged in support of a variety of useful and important activities. For example, tagged items in a shopping cart might be automatically groupable (to facilitate, for example, permitting a shopper to automatically check-out from a corresponding retail establishment) by identifying RFID tags that are moving together. Identifying group movements of RFID tags could also permit a monitoring enterprise to develop helpful information regarding, for example, shopping patterns in a manner that is highly noninvasive to the shopper. As yet another example, a sudden issue with inventory that may require more immediate attention might be more easily identified when many tags of the same SKU are moving together. And as yet another example in these regards, information regarding momentary movements of a plurality of RFID tags in a given area which do not result in movement of those RFID tags away from that area can be used to note or otherwise monitor when a retail establishment's associates are engaged in activities such as straightening up a sales floor.

These teachings could also be leveraged to permit a portable (i.e., movable) reader to read RFID tags under circumstances when those RFID tags might not otherwise respond. This includes an RFID tag that is configured to unilaterally change its own read state other than in response to a mere passage of time and other than in response to merely powering up.

For example, in a given application setting the RFID tags for displayed stock may all be read as they enter the sales floor and have their read states switched from A to B. Also pursuant to this example, it will be presumed that, when in the B state, the RFID tags will not respond to ordinary read interrogations. That said, however, there may be times when an associate, using a hand-held reader, might wish to read all of the RFID tags for items displayed at a given module regardless of the read state of the RFID tag. In such a case, the movement of the portable reader may produce enough RF variations (due to movement of the reader relative to the RFID tags) for the RFID tags to determine their own movement. When such an RFID tag is programmed to then respond to such a determination by switching from the B state to the A state, such a circumstance will cause the RFID tags then presently in state B to switch to state A and hence permit those RFID tags to now respond to the portable reader's interrogations. The foregoing occurs because, from the tag's point of view, the tag is moving relative to the reader (and hence is aware of RF movement) even though, in fact, the tag is not itself physically moving.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. As one example in these regards, and noting that the EPC GEN2 standard defines and will accommodate multiple sessions for a given RFID tag (such as session 0, session 1, session 2, and so forth, where each session is essentially independent and where the aforementioned read states can be independently established for each such session), these teachings will accommodate using the developed motion information independently with respect to each such EPC GEN2 session. For example, if a reader is interrogating a given RFID tag using session 3 then these teachings will accommodate only setting an inventory flag from, say, state B back to state A in that particular session but not, for example, for session 1 or session 2 sessions.

Figure 4:
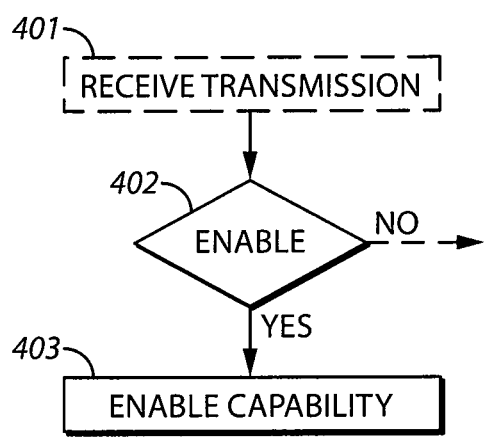
FIG. 4 comprises a flow diagram as configured in accordance with various embodiments of the invention.

As another example in these regards, the described capabilities (including the ability to automatically detect its own motion, to unilaterally change its read state, or a combination of the two) can be rendered selectively enabled if desired. With reference to FIG. 4, and by way of illustration, a process 400 can optionally provide for a step 401 that comprises receiving a transmission from, for example, a reader. Upon receiving such a transmission, at step 402 this process 400 can then determine whether this transmission includes an instruction, signal, or other indication regarding enablement of the above-described functionality. This indication can be as simple as, for example, a one-bit flag that serves to indicate whether the functionality is to be enabled or not. When true, and/or in response to any other criterion of choice, at step 403 the corresponding functionality can be enabled and employed going forward. This could comprise, for example, having the RFID tag automatically respond in some predetermined fashion to a detection of its own relative motion and/or having the RFID tag automatically change its own read state in response to some corresponding condition.

Some application settings may utilize a plurality of RFID-tag readers where at least some of the RFID-tag readers utilize a shared carrier frequency and have at least partially-overlapping coverage areas. In such a case it is possible (in fact, likely) that the signals from these multiple sources will create areas having partial or complete nulls where the signals from the various RFID-tag readers substantially or completely cancel one another (accordingly, a "null" is not the mere absence of a transmitted signal but rather the subtractive combination of two or more signals (or even one signal's subtractive combination with reflections of itself). When the readers are stationary and configured to transmit relatively consistently over time and with respect to power, these nulls will tend to be relatively stationary in the application setting.

Figure 5:
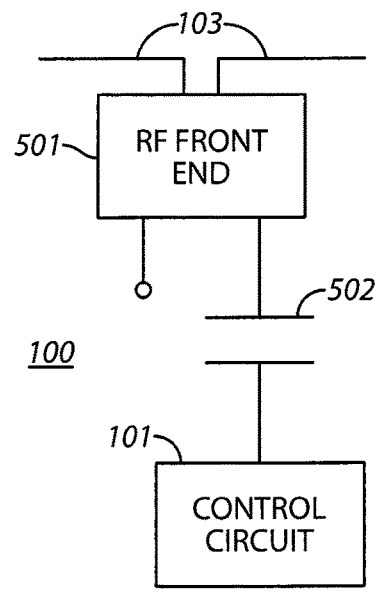
FIG. 5 comprises a schematic representation as configured in accordance with various embodiments of the invention.

At least in such an application setting one can configure the RFID tag 100 to respond to movement by effectively sensing the passage of the RFID tag 100 through such nulls. Referring to FIG. 5, by one approach this can comprise making an appropriate selection of the size of the capacitor 502 (or capacitors, as the case may be) that serves in a typical passive RFID tag to provide power to the control circuit 101 (and other components as desired) at times when the RFID tag 100 is not receiving enabling power transmissions.

Such a capacitor 502 comprises a power source that operably couples to the RFID-tag's antenna 103 (via, for example, a radio-frequency (RF) front end 501 as briefly discussed above) that is configured to become electrically charged via radio-frequency energy received by that antenna 103. In the absence of received energy, of course, the energy stored in the capacitor 501 will discharge over time to meet the ongoing energy requirements of the RFID tag 100. In this illustrative example, the capacitor's size is selected such that the capacitor 502 will become operably discharged at a point in time that corresponds to a typical null-sensing duration of time for a given application setting for the RFID tag 100.

Figure 6:
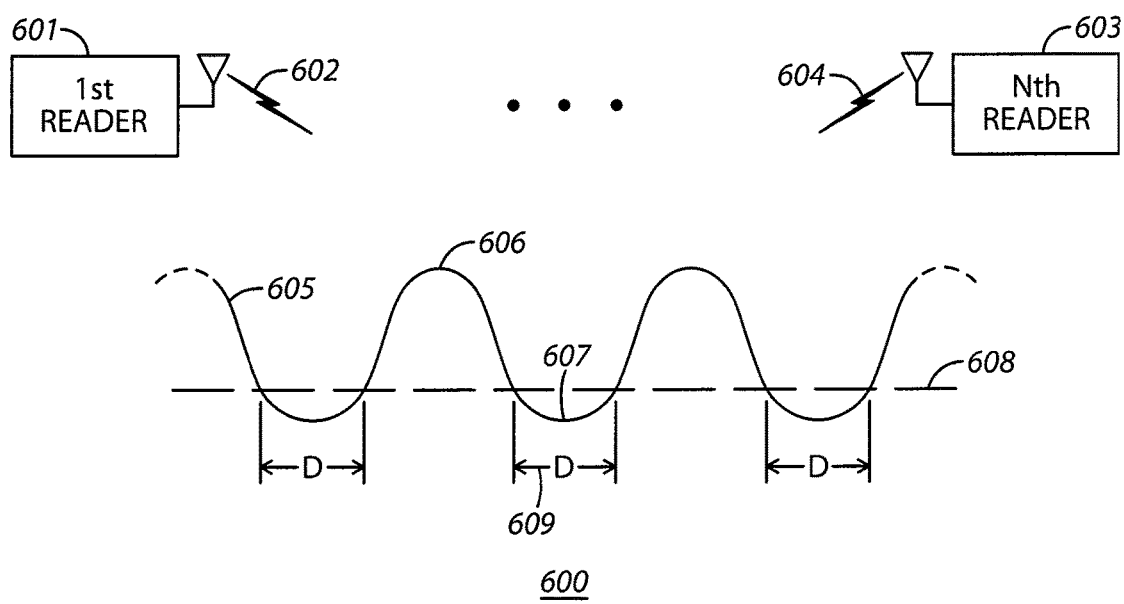
FIG. 6 comprises a schematic representation as configured in accordance with various embodiments of the invention.

The specifics of this null-sensing duration of time can of course vary somewhat with the specifics of the application setting. FIG. 6 illustrates an illustrative application setting 600 that includes two or more RFID tag readers 601 and 603 that each emits its own radio-frequency signal 602 and 604. In this example at least a portion of these signals 602 and 604 coexist in a shared area and give rise to a standing wave 605 having both peaks 606 and nulls 607. Presuming that the RFID tag 100 requires at least a minimum amount of received energy 608 to operate without discharging the capacitor 502, the nulls 607 give rise to small areas (having a length D 609) in the application setting 600 where the capacitor 502 will begin to discharge.

To further this example it will be presumed that it takes a typical person a corresponding typical amount of time to walk at a typical rate in the application setting 600. As a result, the aforementioned null-sending duration of time corresponds to a typical time that such a person, carrying the RFID tag 100, will be in a radio-frequency null 607 when walking at that typical rate through this multi-RFID tag reader application setting 600. Generally speaking, for many application settings this null-sensing duration of time comprises a duration of time in a range from about three seconds to about five seconds (this being the time typically required for such a person to enter, and exit, such a null 607).

Such a duration of time, of course, constitutes an unusual discharge period for an RFID-tag capacitor 502. More typically, such capacitors 502 are sized to either discharge much faster (i.e., in considerably less than one second) or much longer (i.e., in durations often measured in minutes, such as five minutes or even forty minutes). Commonly-used discharge windows, of course, have not previously been selected to match a duration of time that substantially matches the length of time it takes for an RFID tag to pass through a null 607 when carried by an ordinary person walking at an ordinary speed through a given application setting 600.

In some cases it may be useful when sizing the capacitor 502 (and/or when taking into account the materials that comprise the capacitor 502) to consider the typical operating temperature range for the intended application setting. This is because ambient temperature can affect the discharge rate of at least some capacitors 502. In the examples provided above it has been presumed that the application setting experiences a temperature range of about 15 degrees Celsius to about 30 degrees Celsius.

By one approach, if desired, the control circuit 101 can be further configured to determine a passage of time that corresponds to when the RFID tag 100 is in a radio-frequency null 607 at a time when the capacitor 502 does not operably discharge at the ordinarily expected point in time due to an excursion that corresponds to the given application setting 600 and in particular a temperature-based excursion from the expected temperature range. In such a case, the control circuit 101 can then be further configured to use the aforementioned specific reader-response state upon determining, notwithstanding that the capacitor 502 did not become operably discharged, that the RFID tag entered and exited a radio-frequency null 607 based upon that determined passage of time.

So configured, the control circuit 101 can be itself be configured to use a specific reader-response state (as described above) upon regaining power following the power source becoming operably discharged for having traversed a null 607. As described above, this reader-response state can comprise a specific inventory state per EPC GEN2 (such as inventory state B). In this case, a previously-quieted RFID tag 100 will again automatically respond to a reader query upon entering and exiting a null 607 while moving in an ordinary manner (as when carried by a walking person). So configured, the RFID tag 100 will therefore effectively respond to its own relative movement with respect to the readers with which it interacts. Depending upon the capabilities of the RFID tag 100, this detection of a null can be based upon the well-chosen decay characteristics of the RFID tag's capacitor and/or by measuring the passage of time as the RFID tag traverses the null (as when the RFID tag retains an ability to measure the passage of time even when insufficient power is available to ordinarily power the RFID tag's circuitry).

This null-detection approach can be used alone or in combination with the other teachings set forth above as desired. Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

I claim:

1. A radio-frequency identification (RFID) tag configured to unilaterally detect its own motion relative to an RFID-tag reader, comprising:
   an antenna;
   a rectifier operably coupled to the antenna and configured to rectify a signal transmitted by the RFID-tag reader and provide a corresponding rectified output;
   an analog-to-digital converter operably coupled to receive the rectified output and provide a corresponding digitized representation of the rectified output;
   a control circuit operably coupled to the analog-to-digital converter and configured to:
      dynamically establish a detection range;
      monitor the digitized representation of the rectified output and compare the digitized representation to the detection range to thereby determine the RFID tag's own relative movement with respect to the RFID-tag reader; and
      upon detecting the relative movement, automatically re-setting a read state of the RFID tag to permit the RFID tag to respond to interrogations of the RFID-tag reader.

2. The RFID tag of claim 1 wherein the read state comprises a specific state per the Electronic Product Code (EPC) Radio-Frequency Identity Protocols Class-1 Generation-2 Ultra-High Frequency (UHF) RFID Protocol for Communications at 860 MHz-960 MHz Version 1.0.9 (EPC GEN2).

3. The RFID tag of claim 2 wherein the control circuit is configured to automatically re-set the read state by switching the read state from inventory state B as per the EPC GEN2 to inventory state A as per the EPC GEN2.

4. The RFID tag of claim 1 wherein the control circuit is configured to dynamically establish the detection range by defining the detection range to bracket a particular level of the digitized representation of the rectified output.

5. The RFID tag of claim 4 wherein the control circuit is further configured to identify the particular level of the digitized representation of the rectified output as a function of time.

6. The RFID tag of claim 5 wherein the control circuit is configured to identify the particular level of the digitized representation of the rectified output as a function of time by determining when the particular level of the digitized representation of the rectified output has persisted for at least a predetermined period of time.

7. The RFID tag of claim 6 wherein the predetermined period of time is selected from a group comprising:
   0.1 second;
   0.5 second;
   1.0 second.

8. The RFID tag of claim 4 wherein the control circuit is configured to establish the detection range such that the particular level of the digitized representation of the rectified output is centered within the detection range.

9. The RFID tag of claim 8 wherein the control circuit is configured to establish the detection range such that the detection range spans 0.05 volts.

* * * * *